United States Patent [19]

Meyer-Stoll et al.

[11] 3,927,198
[45] Dec. 16, 1975

[54] METHYLOLATED 5,5-DIALKYLHYDANTOIN FILM FORMING SYNTHETIC RESIN AS A HAIR FIXATIVE

[75] Inventors: Hans-Albrecht Meyer-Stoll, Rheinkamp; Johannes Wollner, Kapellen Kreis, Moers; Hans-Heinz Schittek, Rheinkamp, all of Germany

[73] Assignee: Deutsche Texaco Aktiengesellschaft, Hamburg, Germany

[22] Filed: Dec. 28, 1970

[21] Appl. No.: 102,161

Related U.S. Application Data

[62] Division of Ser. No. 827,984, May 26, 1969, abandoned.

[30] Foreign Application Priority Data

May 29, 1968 Germany............................ 1770518

[52] U.S. Cl. ............ 424/47; 260/67.5; 424/DIG. 1; 424/DIG. 2; 424/71; 424/78
[51] Int. Cl.².......................................... A61K 7/11
[58] Field of Search ........ 260/67.5; 424/71, 47, 78, 424/DIG. 1, DIG. 2

[56] References Cited
UNITED STATES PATENTS

| | | | |
|---|---|---|---|
| 2,155,863 | 4/1939 | Jacobson | 260/67.5 |
| 2,532,278 | 12/1950 | Chadwick | 260/67.5 |
| 2,956,927 | 10/1960 | Grant | 424/47 |
| 3,429,825 | 2/1969 | Voedisch | 260/67.5 X |
| 3,505,270 | 4/1970 | Laden | 260/67.5 X |

*Primary Examiner*—Albert T. Meyers
*Assistant Examiner*—Vera C. Clarke
*Attorney, Agent, or Firm*—T. H. Whaley; C. G. Ries; James F. Young

[57] ABSTRACT

Film forming synthetic resins for hair fixative compositions formed by reacting a methylolated 5,5-dialkylhydantoin containing 1–5 carbon atoms in each alkyl group at an elevated temperature in the presence of a bifunctional acid amide and/or amine.

8 Claims, No Drawings

METHYLOLATED 5,5-DIALKYLHYDANTOIN FILM FORMING SYNTHETIC RESIN AS A HAIR FIXATIVE

This application is a divisional application of applicants' parent application, Ser. No. 827,984, entitled "Process for the Production of Film Forming Synthetic Resins for Hair Fixatives," filed May 26, 1969, now abandoned.

The use of solutions of film forming synthetic resins in hair fixative compositions is known in the art. Liquid hair fixative compositions are used in the form of aqueous alcoholic solutions containing about 2–4% weight of lacquer raw materials or synthetic resins and minor amounts of perfume oil or similar agents. Hair fixative compositions suitable for application as aerosols, the so-called hair sprays, usually contain about 3–6% weight of film forming synthetic resin, anhydrous alcohols, such as isopropanol and/or ethanol, halogenated hydrocarbons, such as dichloromethane, which serves as a latent solvent, and/or 25–75% weight of a propellant such as carbon dioxide or the fluorochlorinated hydrocarbons, e.g. the FREONS, and auxiliary materials as perfume oils, plasticizers and the like.

Representative known film forming synthetic resins for hair fixative compositions are the polyvinylpyrrolidone (PVP) and VP/vinyl acetate (VA) copolymers, modified acrylics, quaternized acrylics, methylvinylether-maleic anhydride copolymers, VA-crotonic acid copolymers, polyvinylimidazole, phthalic esters of pentaerythritol, and 5,5-dimethylhydantoin-formaldehyde resins. Synthetic resins based on polyvinylimidazole and cellulose derivatives, although known to be used for hair fixative compositions, are generally less suitable for quality reasons. A disadvantage of synthetic resins based on polyvinylpyrrolidone for hair fixative compositions is that they are hygroscopic and have an unpleasant odor. Moreover, these polymers and copolymers are relatively expensive. Also, it is known to be comparatively difficult to remove them from the hair by washing. Phthalic ester resins are disadvantageous because they tend to form scaly films on the hair which are hard to comb out.

Attempts have been made to eliminate the drawbacks of each of the above types of synthetic resins by mixing them with each other, which may result in a chemical interaction of the components, such as transesterification, etherification, and the like. For example, as shown in the German Published Patent Application No. 1,254,292, minor amounts of a synthetic resin consisting of 5,5-dimethylhydantoin (DMH) and formaldehyde have already been used along with other materials in such mixtures. Synthetic resins of this type are known to be obtained by reacting DMH with an aqueous formaldehyde solution at elevated temperature in the presence of alkalis and optionally with an organic solvent. However, these known commercial DMH/formalin condensates used in hair fixative compositions have molecular weights lower than about 500 and tend to be sticky. Moreover, they are hygroscopic and tend to have a limited storage life. Accordingly, these low molecular weight condensates have only been used in conjunction with other resin condensates and then only in minor amounts.

It is an object of the invention to produce a hair fixative composition whose synthetic resin component is an improved DMH/formalin condensate. Another object is to improve the known process for the production of DMH/formalin condensates in such a way that the products obtained have a relatively high molecular weight and are completely or largely free from the above disadvantages. A still further object is the formulation of a hair fixative composition containing an improved DMH/formalin condensate as the major resin component or as the sole resin component.

According to the invention these objects are achieved by a process for the production of film forming synthetic resins for hair fixative compositions by reacting at an elevated temperature a methylolated 5,5-dialkylhydantoin wherein each alkyl group contains from 1 to 5 carbon atoms, preferably 1 to 2 carbon atoms per alkyl group, in the presence of a bifunctional acid amide and/or an amine.

Further characteristics and advantages of the process according to the invention will become evident from the following description.

It has now been found that by carrying out the self-condensation reaction of a methylolated 5,5-dialkylhydantoin at an elevated temperature in the presence of a bifunctional acid amide and/or amine one is able to obtain a resin product of increased molecular weight on the order of from about 700 to 3000 or more which is free from the objectable stickiness of the prior art condensates or in which this objectionable property is materially decreased.

Suitable temperatures for the condensation reaction mixture can vary from about 70° up to about 115°C. and higher dependent on the temperature of the reaction mixture at reflux.

In the condensation reaction one can use a lower alkanol or an aromatic hydrocarbon as a solvent or reaction diluent and as an aid in the removal of any water present. Representative solvents include methanol, ethanol, isopropanol, butanol and benzene.

In the process of the present invention it is desirable to carry out the methylolation of the 5,5-dialkylhydantoin with aqueous formaldehyde at an elevated temperature at a pH of from about 6 up to about 11. A particularly preferred procedure is to have the bifunctional acid amide present during the methylolation reaction. The formaldehyde and the bifunctional acid amide reactants are present in the methylolation reaction in the mole ratios of 1.5 to 2.5 moles, preferably 1.6 to 2.0 moles of formaldehyde and 0.2 to 2.5 moles, preferably 0.3 to 2.0 moles of the bifunctional acid amide per mole of the hydantoin.

It has been found that the molecular weights of methylolation products of DMH can be considerably increased and the stickiness of the products removed by effecting the methylolation in the presence of urea; molecular weight and "hardness" of the products increase with growing urea content. The ensuing deterioration of the solubility of the products can be overcome without substantial change in the softening ranges of the synthetic resins by using the urea together with minor amounts of a lower ketone, such as acetone or methyl ethyl ketone. Furthermore, the urea may be wholly or partly replaced by a diamine, in particular ethylene diamine. The ketone is used in an amount of from about 0.2 to 1.0 per mole of urea. The amine is present in an amount of from 0.2 to 1 mole, preferably 0.3 to 0.5 mole, per mole of the hydantoin.

In the case of the amine additive, it should preferably not be added until the methylolation of the DMH is completed and most or all of the water and/or any solvent are removed from the methylolated reaction products.

The use of the amine results in a further increase in the molecular weight of the products under the condensation reaction conditions. The preferred amines are ethylenediamine and propylenediamine. It has been found that this effect occurs also when using the higher molecular weight diamines, such as hexamethylenediamine, but the products produced with higher diamines are low-melting or somewhat sticky and therefore are less desirable.

By adding urea and/or ethylenediamine according to the invention (the former having a quasi-hardening, the latter a quasi-plasticizing effect), it is now possible to effect the condensation reaction of the known methylolated reaction products of DMH with formaldehyde to form products having a molecular weight of from about 700 to about 3000 or more, and which products can be made either "harder" or "softer" as required. The products of the invention are suitable to serve as the major or the sole film forming component in hair fixative compositions.

Following is a description by way of example of carrying out the method of the present invention.

EXAMPLE 1

115 grams (0.9 mole) 5,5-dimethylhydantoin, 18 grams (0.3 mole) urea, 3.5 grams (0.06 mole) acetone, and 150 grams (1.5 moles) 30% formalin, with the pH-value adjusted to 10-11 by means of NaOH, were reacted with agitation during 2 hours at 97°-98°C. The initial reaction product was then boiled down until solid, treated with 63 grams isopropanol and 1.2 grams concentrated hydrochloric acid, and further reacted with agitation for another 2 hours at 90°C. After neutralization with triethanolamine, the neutralized resin solution was concentrated under vacuum until the melting point of the resin product exceeded 90°C. The product obtained had a melting range of 96°-106°C.

EXAMPLE 2

384 grams (3 moles) 5,5-dimethylhydantoin, 60 grams (1 mole) urea, 500 grams (5 moles) 30% formalin, and 11.6 grams (0.2 mole) acetone were reacted with agitation at a pH-value of 10-11 and a temperature of 98°C. The solution was boiled down under vacuum until the residue had a melting point of 90°-95°C. The initial reaction product thus obtained was treated with 300 grams methanol and 5.5 grams concentrated hydrochloric acid and condensed for another 2 hours at 68°-72°C. After concentrating the solution under vacuum, a resin product having a melting range of 105°-115°C. was obtained.

EXAMPLE 3

The initial reaction product from Example 2 was treated with 350 grams n-butanol and 0.55 gram concentrated hydrochloric acid and further reacted for 3 hours at 113°C. After concentration under vacuum, a resin product having a melting range of 80°-90°C. was obtained.

EXAMPLE 4

256 grams (2 moles) 5,5-dimethylhydantoin, 60 grams (1 mole) urea, 58 grams (1 mole) acetone, and 400 grams (4 moles) 30% formalin, with a pH-value of 10-11, were reacted with agitation for 2 hours at 85°C. and then concentrated under vacuum. A resin product having a melting range of 118°-130°C. was obtained.

EXAMPLE 5

256 grams (2 moles) 5,5-dimethylhydantoin, 60 grams (1 mole) urea, 11.6 grams (0.2 mole) acetone, and 400 grams (4 moles) 30% formalin, with a pH-value of 10-11, were reacted with agitation for 3 hours at 96°C. and then concentrated to a highly viscous solution. The solution was treated with 200 grams methanol and 3.5 grams concentrated hydrochloric acid and further reacted for 3 hours at 73°C. After boiling down a resin product having a melting range of 95°-115°C. was obtained.

EXAMPLE 6

80.6 grams (0.63 mole) 5,5-dimethylhydantoin were methylolated with 107 grams (1.07 moles) 30% formalin at 55°C. for 60 minutes, neutralized with triethanolamine and concentrated to a solids content of 95%. 100 grams isopropanol and 15.2 grams (about 0.2 mole) 80% ethylenediamine were added to the initial reaction product, and the resulting mixture was further reacted with agitation for another hour at 84°C., and then dehydrated using isopropanol azetrope. A light yellow resin solution was obtained which at 50% solids content had a viscosity of 1-2 minutes as measured in a 4 mm DIN cup at 20°C. The resin product began to melt at 106°C.

EXAMPLE 7

76.8 grams (0.6 mole) 5,5-dimethylhydantoin and 120 grams (1.2 moles) 30% formalin were reacted with agitation for 60 minutes at 88°C., neutralized with triethanolamine and concentrated to a solids content of about 95 percent. 200 ml. benzene and 23.8 grams (about 0.3 mole) 75% ethylenediamine were added and the resulting mixture was refluxed for 3 hours with removal of 22 ml. of water. After removal of the benzene by vacuum distillation a solid resin was obtained which started to get sticky at 100°-110°C.

EXAMPLE 8

256 grams (2 moles) 5,5-dimethylhydantoin and 68.5 grams (0.5 mole) salicylamide were methylolated with 500 grams (5 moles) 30% formalin at a pH-value of 6 for 4 hours at 95°C., concentrated under vacuum and dehydrated with benzene. The solution was adjusted to a pH value of 2 with hydrochloric acid and agitated for 5 hours at boiling temperature until dehydration was completed. After neutralization with triethanolamine and concentration, a faintly yellow resin product was obtained having a melting range of 76°-88°C.

The synthetic resins according to the invention from Examples 1-5 have osmometrically determined molecular weights of about 800-1200, and those from Examples 6 and 7 have molecular weights of 1500-3000.

EXAMPLE 9

The synthetic resin from Example 6, which when dry started to soften at 106°C., was used for preparing a solution containing 3.5% weight resin, about 66% weight anhydrous isopropanol, and 30% weight dichloromethane. 60 grams of this solution and 40 grams of a mixture of FREON 11/12 (70:30) were filled into an aerosol spray can having a spin-effect nozzle. In the table below this solution is referred to as solution A.

In a similar way another solution B was prepared using 1.8% weight each of the dry product from Example 1 and 6.

Another solution C was prepared by mixing the product from Example 6 with a commercial vinylpyrrolidone/vinylacetatecopolymer (molar ratio 70:30) in a weight ratio of 4:1 using the same solvent as for A and B, so that a total resin content of 3.5% weight resulted.

The properties of solutions A-C according to the invention, particularly their effectiveness as sprayable hair fixatives, were compared with those of commercial hair sprays. The solutions used for comparison contained the following film-forming agents:

Solution D: Phthalic ester
Solution E: Partially saponified polyvinyl acetate
Solution F: Vinylpyrrolidone/vinylacetate-copolymer (70:30)
Solution G: Dimethylhydantoin/$CH_2O$ condensate (molar ratio about 3:4; molecular weight about 480)

It should be noted that solution G was specially prepared for comparison purposes and did not constitute a commercial product. Although the condensate contained in solution G is commercially available for use in hair sprays, it is only employed in conjunction with other synthetic resins.

Each of the solutions A-G contained about 3.5% weight synthetic resin.

The properties of the hair fixatives A-G compiled in the table below were rated according to the following scheme:

1 = very good
2 = good
3 = satisfactory
4 = unsatisfactory

TABLE

| Solution | Hair fixing property | Facility of combing | Scaling of the resin film | Feel | washability |
|---|---|---|---|---|---|
| A | 2 | 2 | none | 2 | 2–3 |
| B | 2 | 2 | none | 2–3 | 2 |
| C | 1–2 | 2 | none | 2 | 2 |
| D | 3–4 | 3 | none | 3 | 2–3 |
| E | 2 | 2 | none | 2 | 2 |
| F | 2–3 | 2 | none | 2–3 | 2 |
| C | 3–4 | 2–3 | heavy | 2 | 2 |

As shown in the table, compositions A-C containing the resin product of the invention are equivalent, if not superior, to the commercial hair spray compositions D-F. Moreover, the compositions A-C are practically colorless, odorless, not irritating to the skin and are neutral or at least non-corrosive. Where they show a weakly acid reaction, they can readily be neutralized; where they react alkalinely, neutralization with acids will result only in a slight discoloration without impairment of desirable properties. The compositions A-C can be readily mixed with each other without discloration and therefore are suitable for mutual neutralization. The adjustment of a physiological pH-value by mixing of the compositions is particularly advantageous. Furthermore, they are compatible with the addition thereto of minor amounts of conventional film forming resins, preferably such as vinylpyrrolidone/vinylacetate copolymers or oilfree phthalates.

We claim:

1. A hair fixative composition containing from 1 to about 10% by weight of a film-forming synthetic resin and a solvent for said resin, said film-forming synthetic resin having a molecular weight in the range of from about 700 up to about 3,000 and being obtained by reacting at an elevated temperature in the range of about 70°C. to about 115°C., a methylolated, 5,5-dialkylhydantoin wherein each alkyl group thereof contains from 1 to 5 carbon atoms, in the presence of a reactant member selected from the group consisting of a. from about 0.2 to about 2.5 moles of urea per mole of said hydantoin and from about 0.2 to about 1.0 mole of a low molecular weight ketone per mole of urea;

b. from about 0.2 to about 2.5 moles of salicylic acid amide per mole of said hydantoin;

c. from about 0.2 to about 2.5 moles of a mixture of urea and a diamine per mole of said hydantoin;

d. from about 0.2 to about 1 mole of a diamine per mole of said hydantoin;

e. from about 0.2 to about 2.5 moles of urea per mole of said hydantoin, from about 0.2 to about 1.0 mole of a low molecular weight ketone per mole of urea, and from about 0.2 to about 1 mole of a diamine per mole of said hydantoin; and f. from about 0.2 to about 2.5 moles of salicyclic acid amide per mole of said hydantoin, and from about 0.2 to about 1 mole of a diamine per mole of said hydantoin.

2. A composition as claimed in claim 1 wherein the resin is present in an amount of from about 2 to 4% by weight and the resin has a molecular weight of from about 800 to 1200.

3. A composition as claimed in claim 1 wherein the resin is present is an amount of from about 2 to 4% by weight and the resin has a molecular weight of from about 1500 to 3000.

4. A composition as claimed in claim 1 wherein said ketone is acetone.

5. A composition as claimed in claim 1 wherein said ketone is methylethylketone.

6. A composition as claimed in claim 1 wherein said methylolated, 5,5 dialkylhydantoin is a methylolated, 5,5 dimethylhydantoin.

7. A composition as claimed in claim 1 wherein said diamine is, ethylene diamine and is present in an amount of from about 0.3 to about 0.5 mole per mole of said hydantoin.

8. A hair fixative composition in an aerosol spray can, said composition consisting essentially of an admixture of from about 3 to 6% by weight of the film-forming synthetic resin of claim 1 in a latent solvent selected from the group consisting of an anhydrous alcohol, a halogenated hydrocarbon and a mixture of said anhydrous alcohol and halogenated hydrocarbon, and as the propellant an admixture of fluorochlorinated hydrocarbons.

* * * * *